United States Patent
Burroughs

[15] 3,657,866
[45] Apr. 25, 1972

[54] VEHICLE TOWED ROTARY MOWER

[72] Inventor: Jerome C. Burroughs, P.O. Box 776, Loris, S.C. 29569

[22] Filed: Jan. 18, 1971

[21] Appl. No.: 107,282

[52] U.S. Cl. .................................56/15.5, 56/15.3, 56/15.9
[51] Int. Cl. ...........................................A01d 35/26
[58] Field of Search..........................56/6, 7, 15.3, 15.5, 15.9

[56] References Cited

UNITED STATES PATENTS

| | | | |
|---|---|---|---|
| 2,601,366 | 6/1952 | Chapman | 56/15.5 X |
| 2,560,641 | 7/1951 | Goodlet | 56/15.5 X |
| 3,045,413 | 7/1962 | Sheffer | 56/6 X |
| 3,177,639 | 4/1965 | Hardee | 56/15.3 |

*Primary Examiner*—Russell R. Kinsey
*Assistant Examiner*—J. A. Oliff
*Attorney*—T. Russell Foster

[57] ABSTRACT

A rotary mower for attachment to a towing vehicle such as a tractor which includes a housing for rotatably supporting cutting means connected by means of a gear reduction unit and a drive shaft to the tractor power take-off means, a frame mounted on the housing for transverse sliding movement, pin means on the frame for connecting the frame to the tractor and adjustable bracing means connected to the frame and to the housing together with means for securing the frame in a selected transverse position so as to connect the mower to the tractor in a selected position along a transverse path extending between laterally offset positions on opposite sides of the longitudinal axis of the tractor.

7 Claims, 6 Drawing Figures

INVENTOR
JEROME C. BURROUGHS

BY *T. Russell Foster*

ATTORNEY

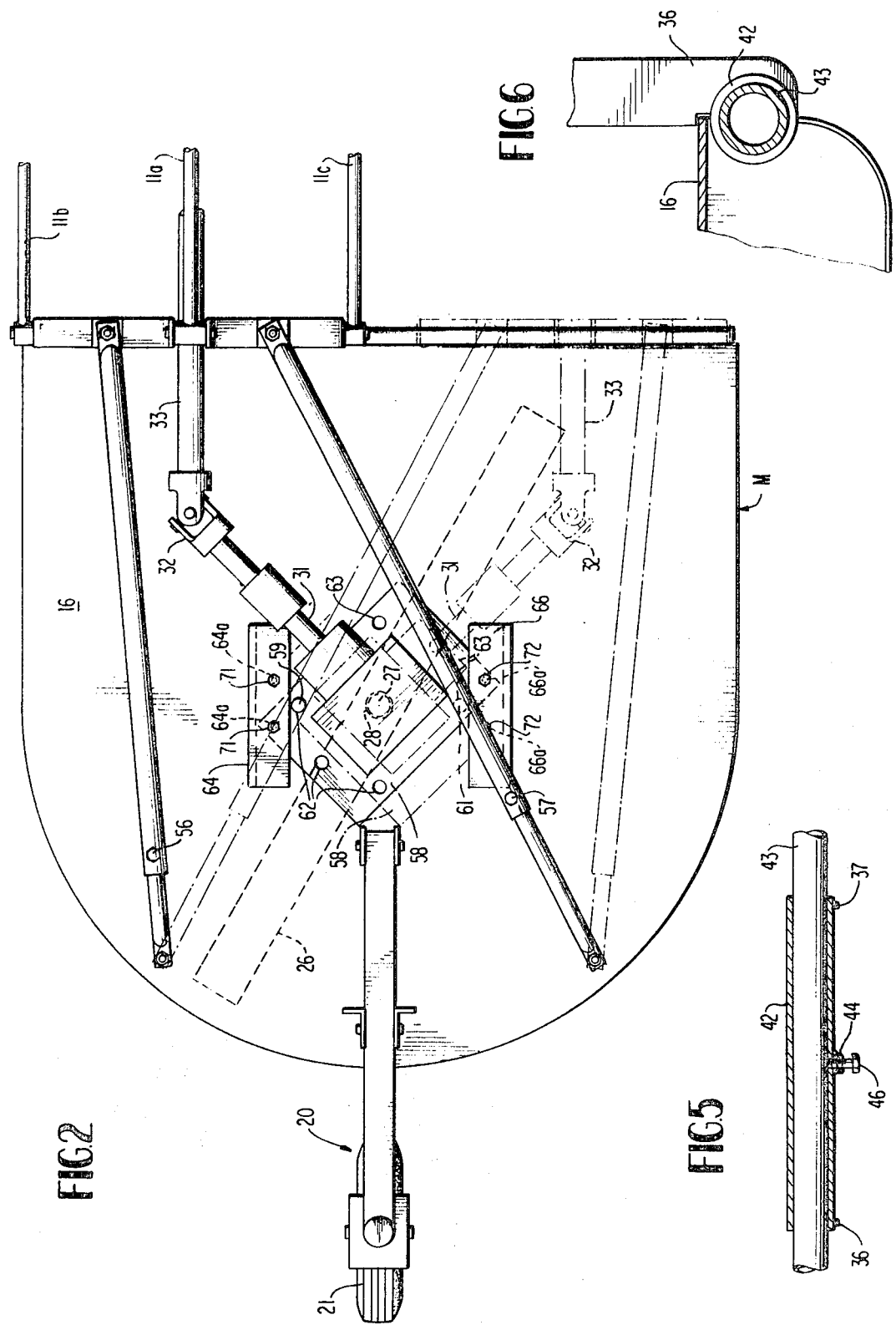

VEHICLE TOWED ROTARY MOWER

This invention relates to mowing apparatus and more particularly to a rotary mower for connection to a towing vehicle such as a tractor.

A common type of mowing apparatus in widespread use today, particularly for use in agricultural activities, is a mower arranged to be attached to a towing vehicle such as a farm tractor or the like. This type of mower generally comprises a housing on which a cutting blade is rotatably supported, the cutting blade being arranged to be connected by a universal shaft to the tractor power take-off. Such a mower may be used for any mowing operation such as grass and weed cutting, the cutting of stalks after crop harvesting, cleaning operations and the like.

In the conventional type of tractor-towed rotary mower in use today, the mower is towed directly behind the tractor in longitudinal alignment therewith so that the center line of the swath cut by the mower corresponds to the center line of the path of the towing vehicle. While satisfactory cutting operations are usually obtained with such an arrangement, in certain instances the terrain is such that the tractor is unable to move the mower through a portion of the terrain where cutting is desired thereby leaving undesirable uncut areas in the terrain. For instance, ditches, slopes and the like are frequently present along the edges of fields which are to be cut so that an attempt to mow such a field completely to the edges would expose the tractor to the hazards of overturning, bogging down, etc. Where there are obstacles present in a field to be cut such as fences or the like, the fences present a barrier to the tractor thereby limiting the extent to which the towed mower may approach the edge of the field with a resultant uncut strip.

It has therefore been proposed to provide a construction for connecting such a rotary mower to a tractor in a laterally off-set relationship for a more complete mowing operation where such obstacles are present. One example of such a construction being shown in U.S. Pat. No. 3,177,639 entitled "Rotary Mower Within An Aligned and An Offset Mast-Type Hitch." While the construction of the aforementioned patent does permit some improvement in the efficiency of a mowing operation, such a construction as well as other similar constructions in use today are characterized by certain limitations which still remain to be overcome. For instance, as shown in the aforementioned patent, only two positions for the rotary mower relative to the tractor can be obtained, a single laterally off-set mowing position and an in-line cutting position. Furthermore, to change the mower connection between these two positions is a complicated and difficult procedure adding considerably to the mowing time and imposing a considerable hardship on the operator who often requires assistance to effect such a changeover operation. Other present day mower structures of this type are similarly complicated and expensive far beyond the economic reach of the typical farmer who is most likely to be the user of such equipment.

Accordingly, a primary object of this invention is to provide a new and novel rotary mower for towing by a vehicle such as a tractor or the like.

Another object of this invention is to provide a new and novel vehicle towed rotary mower which may be connected to a towing vehicle in any selected position within a range extending between laterally offset positions on opposite sides of the centerline of the tractor.

A further object of this invention is to provide a new and novel rotary mower for attachment to a tractor which permits a single operator to easily attach the mower to the tractor with a minimum of effort in either an in-line position or a laterally off-set position on either side of the in-line position.

Still another object of this invention is to provide a new and novel vehicle towed rotary mower which permits the mower cutter to be drivably connected to the tractor power take-off in a simple and easy manner in a selected position corresponding to either an in-line position or oppositely directed, laterally off-set positions relative to the tractor.

This invention further contemplates a provision of a new and novel rotary mower which is composed of a minimum of parts, which is lightweight in construction, which is capable of prolonged use without breakdown and which requires only a simple adjustment to permit the mower to be attached and retained in a selected position relative to the tractor extending between laterally off-set positions on opposite sides of the tractor centerline so as to permit the operator to perform a complete mowing operation in an area regardless of ditches, slopes, obstacles or the like.

Other objects and advantages of the invention will become apparent from the following description taken in connection with the accompanying drawings.

The objects stated above and other related objects in this invention are accomplished by the provision of a housing having a top wall and a pair of side edges the housing being provided with means for supporting the rear end of the housing for movement along a supporting surface. Cutting means are rotatably supported on the housing together with means for drivably connecting the cutting means to the power take-off means, the connecting means being releasably secured by suitable means in a selected rotary position corresponding to the selected position relative to the towing vehicle such as a tractor or the like. An upstanding frame is provided on the housing which is arranged to be connected to the tractor and the frame is supported on the housing adjacent the front end for sliding movement transversely of the mower to permit the frame to be moved into a selected position along a transverse path terminating at opposite ends adjacent the side edges of the housing for connection of the mower to the tractor in a selected relationship with the longitudinal axis of the vehicle throughout a range extending between a laterally off-set position on each side of the vehicle longitudinal axis. Means are provided for releasably securing the frame in the selected position and adjustable bracing means are provided which connect the frame to the housing in any selected position of the frame.

The novel features which are believed to be characteristic of the invention are set forth with particularity in the appended claims. The invention itself, however, both as to its organization and method of operation may be best understood by reference to the following description taken in conjunction with the accompanying drawings in which:

FIG. 2 is an enlarged plan view of the rotary mower of FIG. 1;

FIG. 5 is a sectional view taken substantially along lines 5—5 of FIG. 3 in the direction of the arrows; and FIG. 6 is a sectional view taken substantially along lines 6—6 of FIG. 3 in the direction of the arrows.

Figure 1:
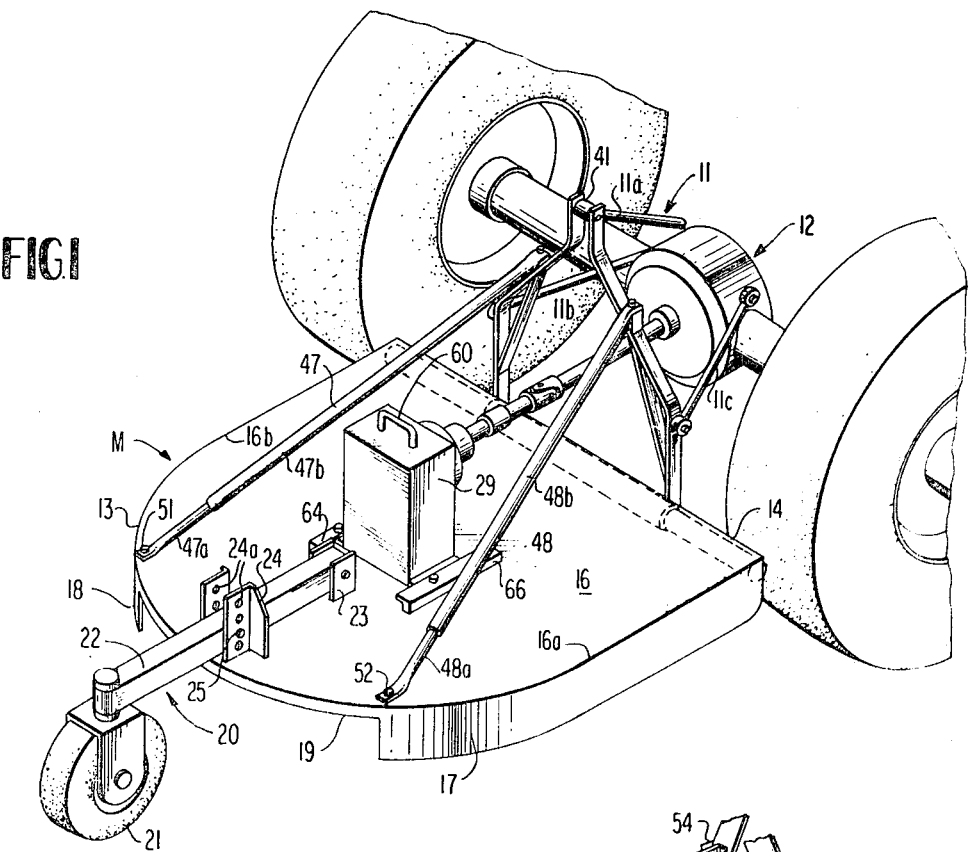
FIG. 1 is a perspective view of the rotary mower of the invention connected to a towing vehicle.

Referring now to the drawings and to FIG. 1 in particular, there is shown a rotary mower constructed in accordance with the invention and designated generally by the letter M. The mower M is arranged to be connected to a towing vehicle such as a tractor, a portion of which is shown in FIG. 1 and designated generally by the letter T. The tractor T is provided with a three-point hitch 11 of conventional construction having arms 11a, 11b and 11c and power take-off means designated generally by the numeral 12 which is also of conventional construction.

The mower M includes a housing 13 having a front end 14 a top wall 16 having side edges 16a, 16b on which are supported downwardly depending skirt portions or side walls 17, 18 preferably formed integrally therewith. The housing 13 is preferably provided with an open rear end 19. The rear end of the housing 13 is supported for movement of the mower M along a supporting surface by suitable means such as a rear wheel assembly designated generally by the numeral 20. The assembly 20 includes a wheel 21 rotatably mounted on one end of an arm 22 pivotally mounted at its other end on a bracket 23 suitably secured to the housing top wall 16. Preferably, the arm 22 may be secured in a selected angular position by means of a bracket 24 having apertures 24a for receiving a pin 25 to position the mower M in a selected spaced relationship with the supporting surface.

The mower M includes cutting means rotatably supported on the housing 13 in underlying relationship with the top wall 16. More specifically, the cutting means include a rotatably mounted cutting blade 26 mounted for rotation in a substantially horizontal plane on a shaft 27 suitably journaled in an opening 28 in the housing top wall 16. Means are supported on the housing top wall for drivably connecting the cutting means or blade 26 to the tractor power take-off means 12. In the illustrated embodiment, the cutting blade shaft 27 is operatively connected to a gear reduction unit 29 arranged to be supported on the housing top wall 16. The gear reduction unit 29 includes an input shaft 31 arranged to be drivably connected to the tractor power take-off means 12 by shaft means including an universal joint 32 and a shaft 33 of any well known construction.

The mower M includes an upstanding frame designated generally by the numeral 34 and means are provided on the frame 34 for connecting the frame to the tractor T. More specifically, the frame 34 is of inverted, substantially U-shaped configuration including a pair of leg members 36, 37. The leg members 36, 37 are provided with pin means including lower pins 38, 39 in the leg members 36, 37 respectively, and an upper pin 41 for interconnecting the upper ends of the leg members 36, 37. As is well known, the pins 38, 39 and 41 are arranged to be suitably connected to the arms 11c, 11b and 11a respectively of the three-point hitch 11 of the tractor T in the well known manner for connecting the frame 34 and therefore the mower M to the tractor T for towing.

Means are provided for supporting the frame 34 on the mower M adjacent front end 14 of the housing 13 for sliding movement transversely of the mower to permit the frame to be moved into a selected position along a transverse path terminating at opposite ends adjacent the side edges 16a, 16b of the housing. Such transverse movement of the frame 34 permits the mower M to be connected to the tractor T in a selected relationship with a longitudinal axis of the tractor T throughout a range extending between a laterally offset relationship with each side of the tractor longitudinal axis as shown in solid lines and broken lines in FIG. 2. More specifically, the lower ends of the leg members 36, 37 are secured by suitable means such as welding or the like to a sleeve member 42 as shown best in FIG. 6. The sleeve member 42 is mounted on a bar member or rod 43 in telescopic relationship therewith and the bar member 43 is supported at opposite ends on the side walls 17, 18 adjacent the front end 14 of the housing 13 as shown best in FIGS. 3, 4.

The frame 34 is therefore supported in an upstanding position on the bar member or rod 43 for sliding movement of the frame along a path extending transversely of the mower M and terminating at opposite ends adjacent the housing side edges 16a, 16b.

Figure 3:
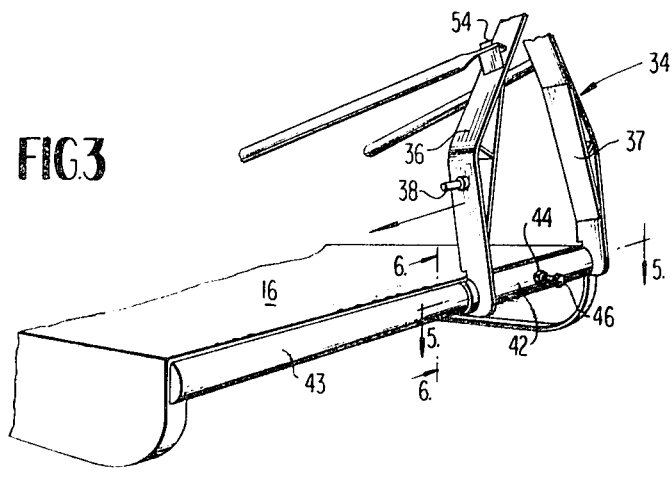
FIG. 3 is a perspective view of a portion of the mower of FIG. 1 with the parts arranged for laterally offsetting the mower in one direction.
Figure 4:
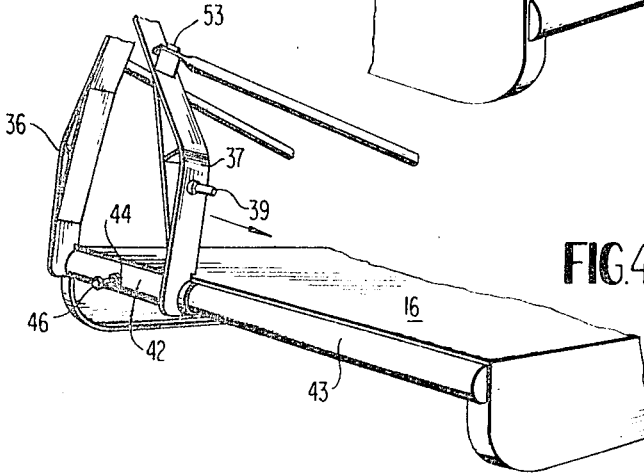
FIG. 4 is a perspective view similar to FIG. 3 showing the parts arranged for laterally offsetting the mower in the opposite direction.

Means are provided for releasably securing the frame 34 in a selected position on the bar member 43. More specifically, the sleeve member 42 is provided with an internally threaded aperture 44 arranged to accommodate a threaded bolt 46. Therefore, when the sleeve member 42 is moved to a selected position on the bar member 43 the inner end of the bolt 46 is moved against the bar member 43 in frictional gripping engagement to retain the sleeve member 42 in the selected position. In FIG. 3, the frame 34 is shown in the fully offset position on one side of the tractor longitudinal axis or path of travel and in FIG. 4, the frame 34 is shown in the fully offset position on the other side of the tractor longitudinal axis.

The mower M includes adjustable bracing means connected to the frame 34 and housing 13 for bracing the frame 34 but permitting the frame to be moved into any selected position on the bar member 43. More specifically, the bracing means includes a pair of longitudinally adjustable rod members 47, 48 secured to the housing top wall 16 at one end by suitable means such as bolts 51, 52 respectively. The other ends of the rod members 47, 48 are suitably secured by bolts 53, 54 or the like to the leg members 37, 36 respectively of the frame 34.

The rod members 47, 48 are arranged for longitudinally expansion and contraction into an adjusted length to permit movement of frame 34 into the selected position on the bar member 43. In the preferred embodiment, the rod members 47, 48 include rod and sleeve members 47a, 47b and 48a, 48b respectively which are arranged telescopic relationship so as to permit longitudinal expansion and contraction of each of the rod members 48, 47 during the transverse movement of the frame 34 as shown best in FIG. 2. Preferably, each of the rod members 47, 48 are provided with means for securing the rod members in the adjusted length which includes threaded bolts 56, 57 which are arranged to maintain the members 47a, 47b and 48a, 48b in frictional gripping engagement when the frame 34 has been positioned in the selected position.

Means are provided on the housing top wall 16 for releasably securing the connecting means including the gear reduction unit 29 in a selected rotary position corresponding to the selected position of the frame 34 on the transverse path of the frame. More specifically, the gear reduction unit 29 includes a mounting plate 58 suitably secured thereto by welding or the like and means on the housing top wall 16 for releasably securing the mounting plate 58 to the housing top wall 16 in a plurality of rotary positions. More specifically, the mounting plate securing means includes a pair of spaced upstanding dowels 59, 61 and a plurality of apertures 62, 63 on opposite sides the mounting plate 58 as shown best in FIG. 2. The dowels 59, 61 are arranged to be received within an associated pair of apertures 62, 63 in each of three selected rotary positions of the gear reduction unit 29. It should be understood that three of such associated pairs of apertures 62, 63 are provided on the mounting plate 58. Any suitable number may be provided, however, corresponding to the number of rotary positions desired. Preferably the gear reduction unit 29 is provided with a handle 60 to facilitate the positioning of the unit 29 in the selected rotary position.

Releasable stop means are provided on the housing top wall for limiting upward movement of the mounting plate 58 on the dowels 59, 61. Most specifically, a pair of plate members 64, 66 are suitably secured by welding or the like to the housing top wall 16 in vertically U-spaced relationship therewith so as to accommodate marginal edge portions of the mounting plate 58 as shown best in FIG. 2. Each of the plate members 64, 66 is provided with threaded apertures 64a, 66a which are arranged to threadedly accommodate retaining bolts 71, 72 respectively. When the bolts 71, 72 are released, the unit 29 is lifted and rotated to the selected rotary position the unit 29 is then dropped down so that the dowels 59, 61 are received within the selected pair of apertures 62, 63 in the mounting plate 58 and the front ends of the retaining bolts 71, 72 are moved into threaded engagement with the underlying marginal edge of the mounting plate 58 to prevent upward movement of the mounting plate 58 from the dowels 59, 61.

Having thus described the invention, what is claimed is:

1. A rotary mower for attachment to a towing vehicle such as a tractor having a hitch and power take-off means comprising, in combination, a housing having a top wall and a pair of side edges, cutting means rotatably supported on said housing in underlying relationship with said top wall, means supported on said housing top wall for drivably connecting said cutting means to said power take-off means, an upstanding frame, means on said frame for connecting said frame to said vehicle, means for supporting said frame on said mower adjacent the front end of said housing for sliding movement of said mower transversely of said frame to permit said mower to be moved into a selected one of a plurality of positions along a transverse path terminating at opposite ends adjacent the side edges of said housing for connection of said mower to said vehicle in a selected relationship with the longitudinal axis of said vehicle throughout a range extending between a laterally offset relationship with each side of said longitudinal axis, means for releasably securing said mower in said selected position, means for adjustably bracing and connecting said housing to said frame, means on said top wall for releasably securing said connecting means for said cutting means in a selected rotary position corresponding to the selected position of said mower along said path and means for supporting the rear end of said housing for movement along a supporting surface.

2. A rotary mower in accordance with claim 1 wherein said means for slidably supporting said frame comprises a transversely extending bar member having opposite ends supported on said housing adjacent said housing side edges and a sleeve member on said frame mounted on said bar member in telescopic relationship therewith for sliding movement of said mower along said path.

3. A rotary mower in accordance with claim 2 wherein said means for releasably securing said mower in said selected position comprises bolt means on said sleeve member engageable with said bar member for clamping said sleeve member to said bar member in said selected position.

4. A rotary mower in accordance with claim 2 wherein said frame is of inverted, substantially U-shaped configuration including a pair of leg members, said leg members having lower end portions secured to said sleeve member and wherein said means for connecting said frame to said vehicle comprise pin means on said leg members.

5. A rotary mower in accordance with claim 4 wherein said adjustable bracing means comprise a pair of longitudinally adjustable rod members each connected at one end to one of said leg members and at the other ends to said housing, each of said rod members being arranged for longitudinal expansion and contraction into an adjusted length for movement of said mower into said selected position on said path and means for releasably securing said rod members in said adjusted length.

6. A rotary mower in accordance with claim 5 wherein said means for drivably connecting said cutting means to said power take-off means comprise a gear reduction unit operatively connected to said cutting means, shaft means for connecting said gear reduction unit to said power take-off means and wherein said means for securing said connecting means in a selected rotary position includes a mounting plate on said gear reduction unit, means on said housing top wall for releasably securing said mounting plate to said top wall in a plurality of rotary positions to position said gear reduction unit in said selected rotary position.

7. A rotary mower in accordance with claim 6 wherein said mounting plate securing means comprises at least one pair of oppositely disposed, upstanding dowels on said housing top wall, said mounting plate having a plurality of pairs of apertures therein, each of said pairs of apertures being arranged to accommodate said pair of dowels in one of said plurality of rotary positions of said gear reduction unit and releasable stop means on said housing top wall for limiting upward movement of said mounting plate from said dowels.

* * * * *